J. L. BOOTH.

Grain Separator.

No. 1,045. Reissued Sept. 25, 1860.

WITNESSES

C. W. Wetmore

J. F. Heath

INVENTOR

J. L. Booth

N. PETERS, Photo-Lithographer, Washington, D. C.

UNITED STATES PATENT OFFICE.

JONATHAN L. BOOTH, OF ROCHESTER, NEW YORK.

IMPROVEMENT IN GRAIN-SEPARATORS.

Specification forming part of Letters Patent No. 25,484, dated September 20, 1859; Reissue No. 1,045, dated September 25, 1860.

*To all whom it may concern:*

Be it known that I, J. L. BOOTH, of Rochester, in the county of Monroe and State of New York, have invented a new and Improved Grain-Separating Device; and I do hereby declare that the following is a full, clear, and exact description of the same, reference being had to the annexed drawings, making a part of this specification, in which—

Figure 2:
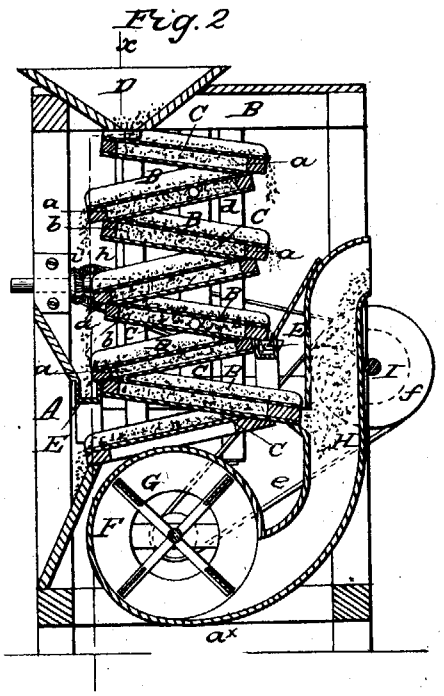
Figure 1:
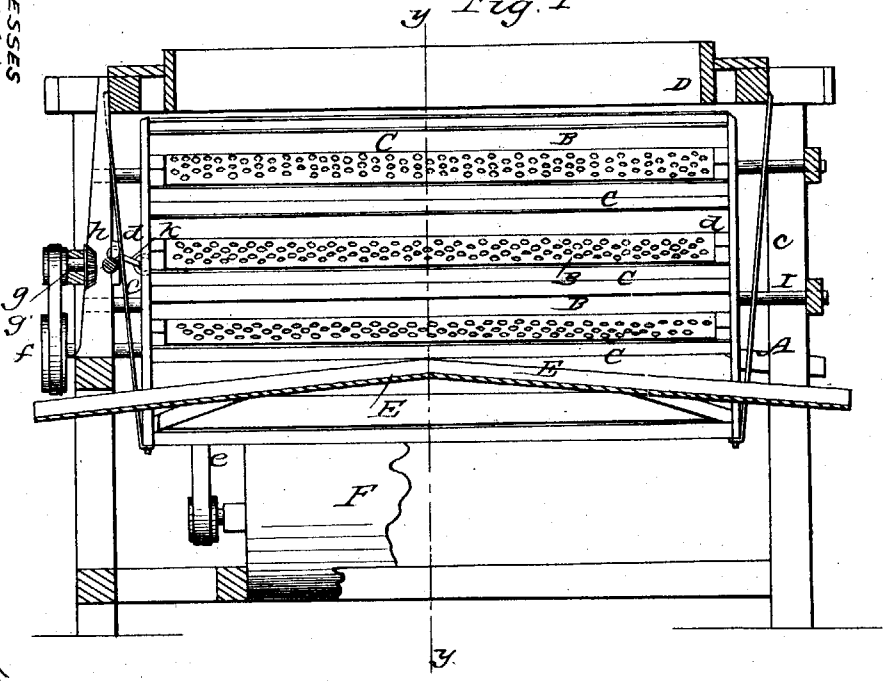

Figure 1 is a vertical longitudinal section of my invention, taken in the line *x x*, Fig. 2. Fig. 2 is a vertical transverse section of the same, taken in the line *y y*, Fig. 1.

Similar letters of reference indicate corresponding parts in the two figures.

This invention consists in the employment or use of zigzag screens and boxes having a proper shake motion communicated to them, and so arranged that the grain may pass consecutively over and through them and be subjected to a thorough screening operation.

The invention also consists in using in connection with the zigzag screens and boxes aforesaid a revolving-fan and spout so arranged that the grain will be subjected to an efficient blast for the separation of all light impurities therefrom.

To enable those skilled in the art to fully understand and construct my invention, I will proceed to describe it.

A represents a suitable rectangular frame in which a series of inclined screens, B, are secured by elastic pendants C′. The screens B may be formed of perforated zinc or other sheet metal, and placed alternately in reversed inclined positions, as shown clearly in Fig. 2. Each screen B is placed on the top of what may be termed a "shallow box," C, the boxes extending the whole length of the screens, and receiving what passes through them, and discharging the same on the elevated ends of the screens, immediately below them, openings *a* being made at the lower part of each box C to allow the escape of the contents therefrom. The upper or most elevated part of each screen B is provided with a smooth or unperforated surface, *b*, said surface *b* first receiving the grain, and consequently their position is immediately below the openings *a*, that of the uppermost screen being immediately below the discharge-orifice *c* of the hopper D. The screens and boxes are secured in proper position by uprights *d*, which are attached to each end of them, the elastic pendants C being secured to the lower ends of the uprights. The hopper D is of the usual form, about equal in length to the screens B, and is secured in the upper part of the frame A. To the lower parts of the uprights *d* inclined troughs E are secured, said troughs being so placed as to catch the droppings from the screens and discharge the same at the ends of the machine.

Within the frame A, and directly below the lowermost box, C, a fan-box, F, is placed containing a fan, G. The fan G is of ordinary construction, as well as the box C, and the latter communicates with an upright spout or passage, H, which receives at about the center of its height the contents of the lowest screen B.

At one end of the frame A there is placed a horizontal shaft, I, from which the fan G is driven by belts *e*, one at each end. At one end of the shaft I there is also placed a pulley, *f*, from which a small shaft, *g*, is driven by a belt, *g′*. The inner end of the shaft *g* has a bevel-pinion, *h*, placed on it, said pinion gearing into a corresponding pinion, *i*, which has a crank, *j*, at one end, from which a shake motion is given the screens and boxes by a connecting-rod, K.

The operation is as follows: The grain to be separated and cleansed from impurities passes into the hopper D and through the opening *c* on the uppermost screen B. The grain first strikes the smooth or imperforated portion *b* of said screen, and any oats that may be mixed with the grain are turned flatwise and will pass off the depressed end of the screen. Some portion of oats, however, will pass through, but they will be discharged by the box C on the next screen below, and will be subjected to a like operation, a majority of the oats being separated from the wheat during each passage over the several screens, and when the grain reaches the last or lowermost screen all the oats will be separated therefrom, the lowermost screen B being a cockle-screen, the cockle being discharged from the lowermost box, C. The chess and other light impurities are discharged with the wheat from the cockle-screen into the spout H, and the chess and light impurities are blown upward out from the spout H, the grain being discharged at *a**. The oats drop into the troughs E, and are discharged by them at each end of the machine.

This invention is now in practical operation and operates perfectly, separating oats from wheat which would have otherwise been ground with the wheat into flour, for, so far as I am aware, no separator has been hitherto devised for separating oats from wheat, especially small wheat, which is of about the same specific gravity as oats, and therefore precludes the separating by a blast.

What I claim as new, and desire to secure by Letters Patent, is—

1. The combination of the zigzag screens and boxes B C, having a shake motion given them so as to have the grain pass consecutively over and through them, and arranged relatively with each other to operate substantially as and for the purpose set forth.

2. The inclined zig-zag screens and boxes B C, with or without the troughs E, in connection with the revolving fan G and spout H, arranged substantially as and for the purpose set forth.

JONATHAN L. BOOTH.

Witnesses:
B. GIROUX,
M. M. LIVINGSTON.